United States Patent [19]
Wolska-Klis

[11] Patent Number: 5,439,104
[45] Date of Patent: Aug. 8, 1995

[54] EYEGLASS CLEANING STATION

[76] Inventor: Mariola Wolska-Klis, 1015 Country Side Trace, Louisville, Ky. 40223

[21] Appl. No.: 224,582

[22] Filed: Apr. 7, 1994

[51] Int. Cl.$^6$ .............................................. B65D 69/00
[52] U.S. Cl. ...................... 206/233; 206/38; 221/96
[58] Field of Search ............... 206/223, 233, 494, 38; 15/214; 221/34, 45, 96

[56] References Cited

U.S. PATENT DOCUMENTS

| | | | |
|---|---|---|---|
| 2,789,725 | 4/1957 | Carper | 221/96 |
| 3,980,203 | 9/1976 | Dearling | 221/96 |
| 4,159,772 | 7/1979 | Beck | 206/233 |
| 4,436,224 | 3/1984 | McInerny | 221/96 |
| 4,667,846 | 5/1987 | Marceau | 221/34 |
| 5,035,321 | 7/1991 | Denton | 206/233 |
| 5,054,612 | 10/1991 | Meyer, Jr. | 221/34 |
| 5,156,275 | 10/1992 | Murray, Sr. | 206/38 |

*Primary Examiner*—David T. Fidei

[57] ABSTRACT

An eyeglass cleaning station including a compartmented housing containing a dispensing bottle of liquid lens cleaning material and a dispensing box of disposable lens cleaning tissue. A countertop emplaceable eyeglass cleaning station having laterally disposed cleaning materials and an adhesively attached wall mounted eyeglass cleaning station having cleaning materials vertically disposed are disclosed.

5 Claims, 3 Drawing Sheets

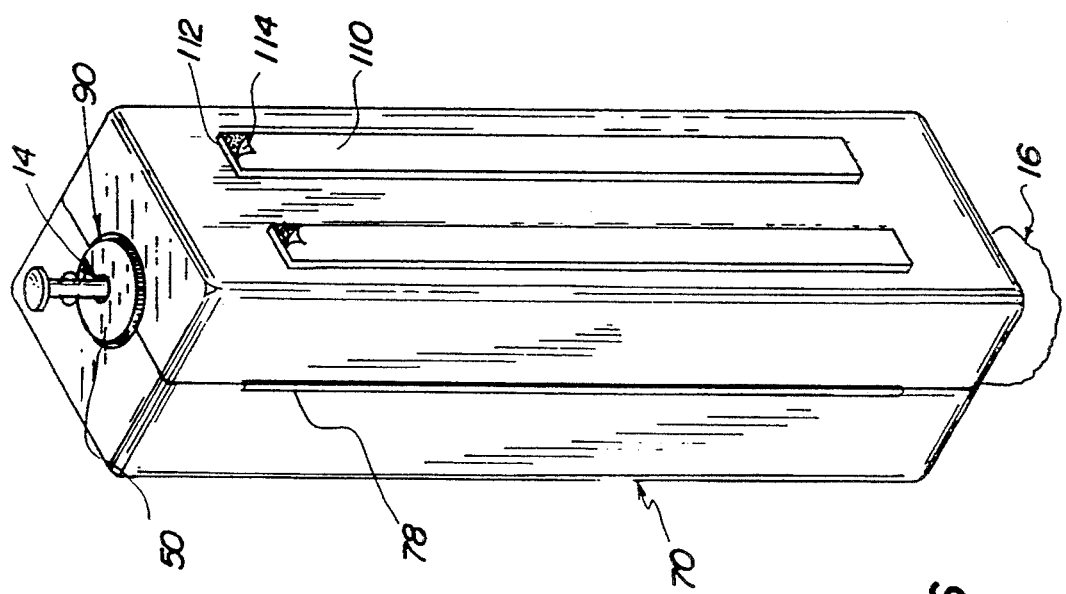
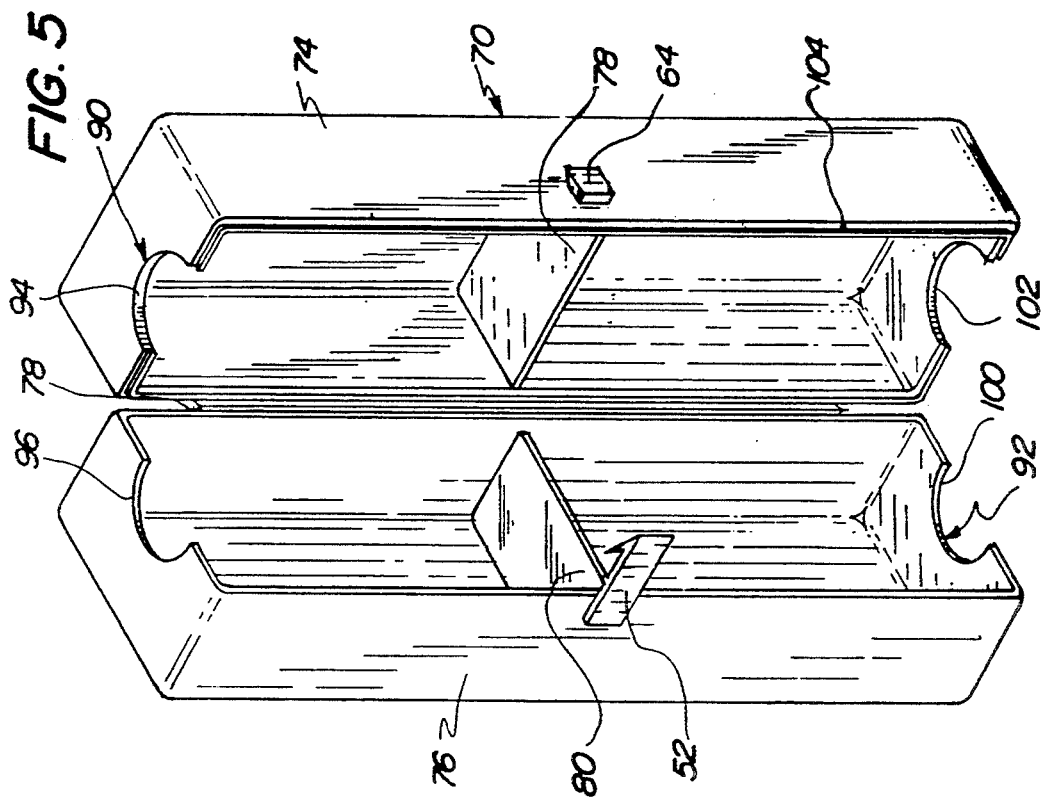

EYEGLASS CLEANING STATION

BACKGROUND OF THE INVENTION

1. Field of the Invention

The present invention relates to devices and apparatus employed for the cleaning of eyeglasses and more particularly pertains to an eyeglass cleaning station which may be employed to provide relatively small portions of eyeglass cleaning materials for casual use in the home or office.

2. Description of the Prior Art

The use of eyeglass cleaning stations is known in the prior art. More specifically, eyeglass cleaning stations heretofore devised and utilized for the purpose of providing eyeglass cleaning materials in a centralized format are known to consist basically of familiar, expected and obvious structural configurations, notwithstanding the myriad of designs encompassed by the crowded prior art which have been developed for the fulfillment of countless objectives and requirements.

The present invention is directed to improving devices for an eyeglass cleaning station in a manner which is safe, secure, economical and aesthetically pleasing.

For example, U.S. Pat. No. 5,083,661 to Burwell discloses a lens and/or eyeglasses cleansing device comprising an elongated storage container housing a cleaning cloth fastened to a cord member wherein the cord member extends through an aperture in an end of the container thereby providing a means for retraction of the cloth for storage by pulling the cord. There is no provision in the Burwell invention for introducing additional glasses cleaning aids such as liquids and furthermore the cleaning cloth is susceptible to gathering dust, grit, and other materials which can easily damage the optical surface of eyeglass lenses. The present invention includes aa liquid lens cleaner and a disposable clothlike eyeglass cleaner which when used conjunctively provide a superior level of eyeglass cleanliness. And the present invention's employ of disposable clothlike eyeglass cleaners provides a clean, grit free cleaning tool for each eyeglass cleaning operation.

In U.S. Pat. No. 5,000,204 to Smith an eyeglass cleaning kit and method of cleaning eyeglasses is disclosed. The Smith invention comprises a chemically treated pig skin chamois housed within an airtight case suitably sized to be attachable to a short chain and be used as a key holder. The pig skin chamois is chemically treated with fungicide and is moistened periodically to assist in the cleaning process. The pig skin chamois is susceptible to capturing dust, grit, and other materials which may harm the optical surface of eyeglass lenses. A variable amount of liquid cleaning agent as is generally available from the pig skin chamois is applied to the eyeglass lens. Dilution and contamination of liquid cleaning agent in use and storage is another disadvantage of the Smith invention. The present invention is unsusceptible to capture of dust, grit, and other materials because the cleaning fabric is disposable and held in good supply within the cleaning station and furthermore is readily replaceable with new materials. And the liquid lens cleaner of the present invention is contained in a container retaining an environmental seal between applications and being therefore impervious to contamination.

In U.S. Pat. No. 4,796,751 to Madkour a portable eyeglass cleaning device is described comprising a portable kit containing a liquid lens cleaner absorbed within an absorbent material and a dry wiping material in separate compartments. The Madkour invention is limited to a single or very limited number of cleanings and is applied as a fully disposable eyeglass cleaning device. The rapid evaporation of most lens cleaning agents will render the absorbent material employed dry and of little practical use after a short exposure to the environment. The wiping material of the Madkour invention is practically limited to a single use or very few uses because of dust, grit, and other contamination normally encountered in the eyeglass cleaning process. The present invention is of small size but not of a portable design and therefore contains a supply of cleaning materials adequate for several eyeglass cleaning procedures. The sealed container holding lens cleaner fluid and the disposability of lens wiping materials of the present invention ensure the supply of liquid cleaner and a clean lens wiper for each application.

In U.S. Pat. No. 4,347,010 to Petkoff a cleaning device for eyeglasses is disclosed wherein an elongated casing contains extractable tongs having spongelike wiper pads disposed upon flattened gripping free ends. A film bag reservoir containing lens cleaning fluid and a conduit permits transfer of the fluid cleaner to the spongelike wiper pads by application of pressure to the film bag. A disadvantage in this prior art lies in a lack of provision for replacement of the wiping pads after each cleaning operation and the absence of a dry wiping provision to remove non-evaporated liquid lens cleaner. The present invention has disposable wiper materials which are used for cleaning conjunctively with liquid lens cleaner and for dry wiping each lens afterward thereby providing an optimal cleaning function.

U.S. Pat. No. 3,480,022 to Richardson et al. discloses a cleaning device for eyeglasses. The disclosure teaches an apparatus having a bowl containing cleaning fluid and a centrally mounted, rotating eyeglass supporting rack wherein the supporting rack is raised and lowered during rotation to effect cleaning and drying cycles. The disclosure makes no provision for manual power and requires electrical input to provide rotation of the supporting rack. Furthermore, there are no provisions for wiping the eyeglass lens. Wiping is capable of removing the deposits ordinarily remaining after air drying a lens having been cleaned using a liquid cleaning agent. There is no teaching to renew the relatively large quantity of liquid cleaner after one or even a few uses. The present invention provides disposable eyeglass cleaning materials for wiping and requires a small quantity of liquid lens cleaner which is fully extended with each cleaning.

In this respect, the according to the present invention substantially departs from the conventional concepts and designs of the prior art, and in so doing provides an eyeglass cleaning station apparatus primarily developed for the purpose of casual cleaning of eyeglasses using a disposable lens wiping means and liquid lens cleaner provided to the user in a convenient housing.

Therefore, it can be appreciated that there exists a continuing need for new and improved eyeglass cleaning station which can be employed in the home or office to permit cleaning eyeglasses having the advantages of wet and dry wiping technique. In this regard, the present invention substantially fulfills this need.

As illustrated by the background art, efforts are continuously being made in an attempt to improve techniques and apparatus for cleaning eyeglasses. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of eyeglass cleaning devices now present in the prior art, the present invention provides an improved eyeglass cleaning station construction wherein the same can be utilized for the casual cleaning of eyeglasses. As such, the general purpose of the present invention, which will be described subsequently in greater detail, is to provide a new and improved eyeglass cleaning station apparatus and method which has all the advantages of the prior art eyeglass cleaning apparatus and none of the disadvantages.

The invention is defined by the appended claims with the specific embodiment shown in the attached drawings. For the purpose of summarizing the invention, the invention may be incorporated into a casing having a first compartment holding a container of lens cleaning fluid and a second compartment holding a package of lens cleaning tissue.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an eyeglass cleaning station holding liquid and dry eyeglass cleaning materials.

It is therefore an additional object of the present invention to provide a new and improved eyeglass cleaning station which has all the advantages of the prior art eyeglass cleaning stations and none of the disadvantages.

It is another object of the present invention to provide a new and improved eyeglass cleaning station which may be easily and efficiently manufactured and marketed.

It is a further object of the present invention to provide a new and improved eyeglass cleaning station which is of a durable and reliable construction.

An even further object of the present invention is to provide a new and improved eyeglass cleaning station which is susceptible of a low cost of manufacture with regard to both materials and labor, and which accordingly is then susceptible of low prices of sale to the consuming public, thereby making such eyeglass cleaning stations economically available to the buying public.

Still yet another object of the present invention is to provide a new and improved eyeglass cleaning station which provides in the apparatuses and methods of the prior art some of the advantages thereof, while simultaneously overcoming some of the disadvantages normally associated therewith.

Still another object of the present invention is to provide a new and improved eyeglass cleaning station of small size and for casual use in the routine cleaning of eyeglasses.

Yet another object of the present invention is to provide a new and improved eyeglass cleaning station having an appearance which is acceptable to the general public for use in exposed locations of the home and office including, but not limited to, countertops and dressers.

Even still another object of the present invention is to provide a new and improved eyeglass cleaning station which can be refilled of associated cleaning materials and agents easily and inexpensively.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front perspective view of the alternate embodiment of the eyeglass cleaning station in the open position.

FIG. 6 is a rear perspective view of the alternate embodiment of the eye glass cleaning station showing an adhesive wall attachment means.

DESCRIPTION OF THE PREFERRED EMBODIMENT

Figure 1:
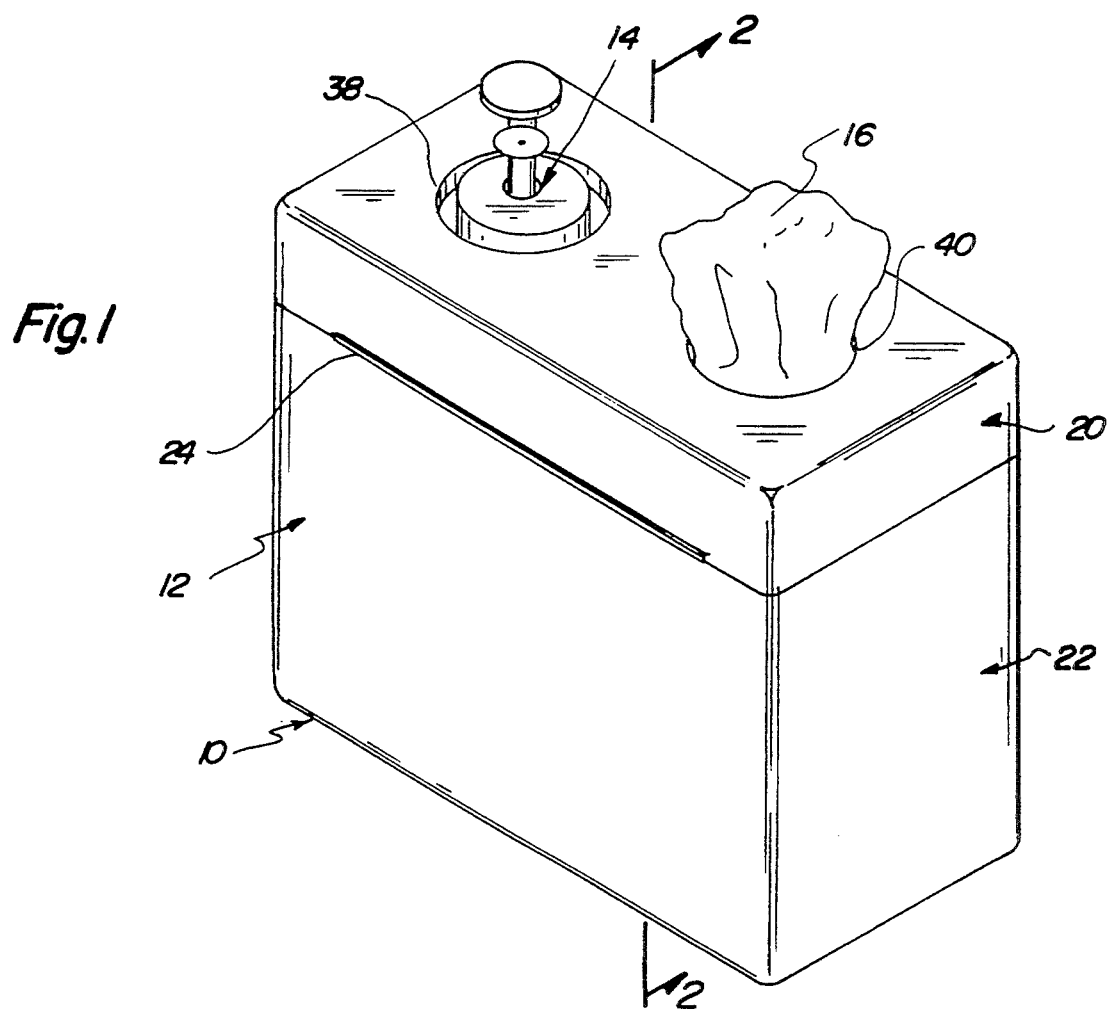
FIG. 1 is a perspective view of the eyeglass cleaning station showing a horizontal disposition of lens tissue and liquid cleaner.

With reference now to the drawings, and in particular to FIG. 1 thereof, a new and improved eyeglass cleaning station embodying the principles and concepts of the present invention and generally designated by the reference numeral 10 will be described.

From an overview standpoint, the eyeglass cleaning station is adapted for use by humans to enable casual cleaning of eyeglasses. The eyeglass cleaning station 10 comprises a casing 12 holding both a lens cleaning fluid bottle 14 and a multiplicity of lens wiping tissues 16 for ready use. See FIG. 1.

More specifically, it will be noted that the eyeglass cleaning station 10 comprises a compartmented casing 12 having a hinged lid 20 permitting the introduction of the lens cleaning fluid bottle 14 and lens tissues 16. The casing 12 comprises a rectangularly sided box having a lid 20 joining a compartmented base 22 by a hinge 24. Casing 12 may be fabricated from polymeric materials by injection molding, or casing 12 may comprise wood composition also brass or ceramic.

Figure 2:
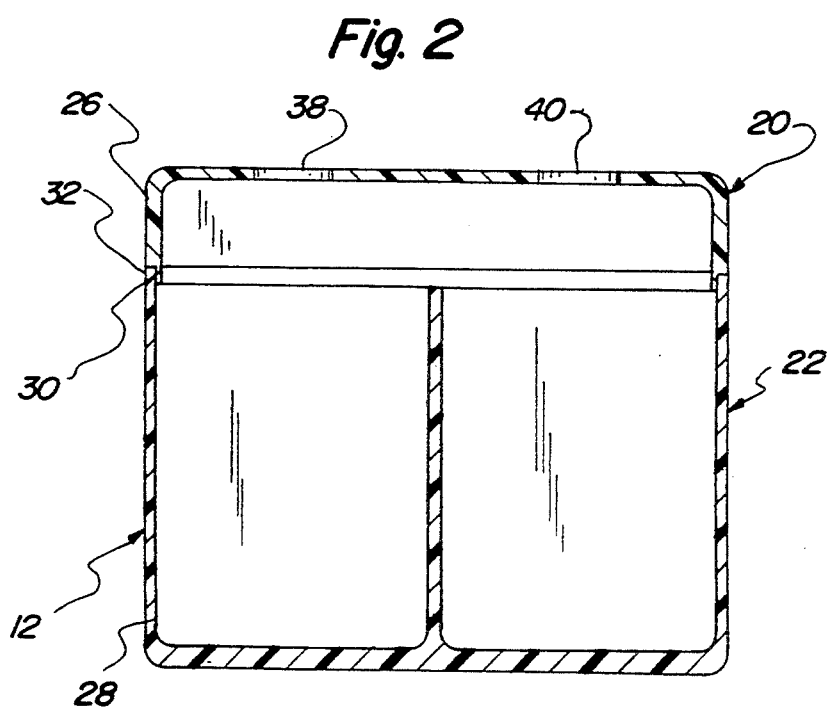
FIG. 2 is a sectional view of the eyeglass cleaning station taken substantially upon a plane indicated by the section line 2—2 of FIG. 1.

Hinge 24 comprises a thin stretched portion of a material composition of the lid 20 and the compartmented base 22 treated in a manner granting a great degree of flexibility and strength and commonly referred to as a living hinge. Or a separate hinge 24 comprising coacting hinge members and a hinge pin may be affixed to lid 20 and base 22 using adhesives or other fastening means. Or hinge 24 may comprise an elongated fabric or polymeric tapelike member adhesively fastened to lid 20 and compartmented base 22. See FIG. 2.

Lid sidewalls 26 are formed somewhat thicker than base sidewalls 28 thereby providing for an engaging lip 30 which maintains alignment of lid 20 upon compartmented base 22 effecting a joint 32 having a smooth external transition surface. Lip 30 extends along the complete inside periphery of lid 20, or lip 30 extends only along those sidewalls not forming hinge 24. Compartmented base 22 comprises two compartments separated by a wall 34 wherein said wall 34 extends from the floor 36 no further than lip 30.

Figure 3:
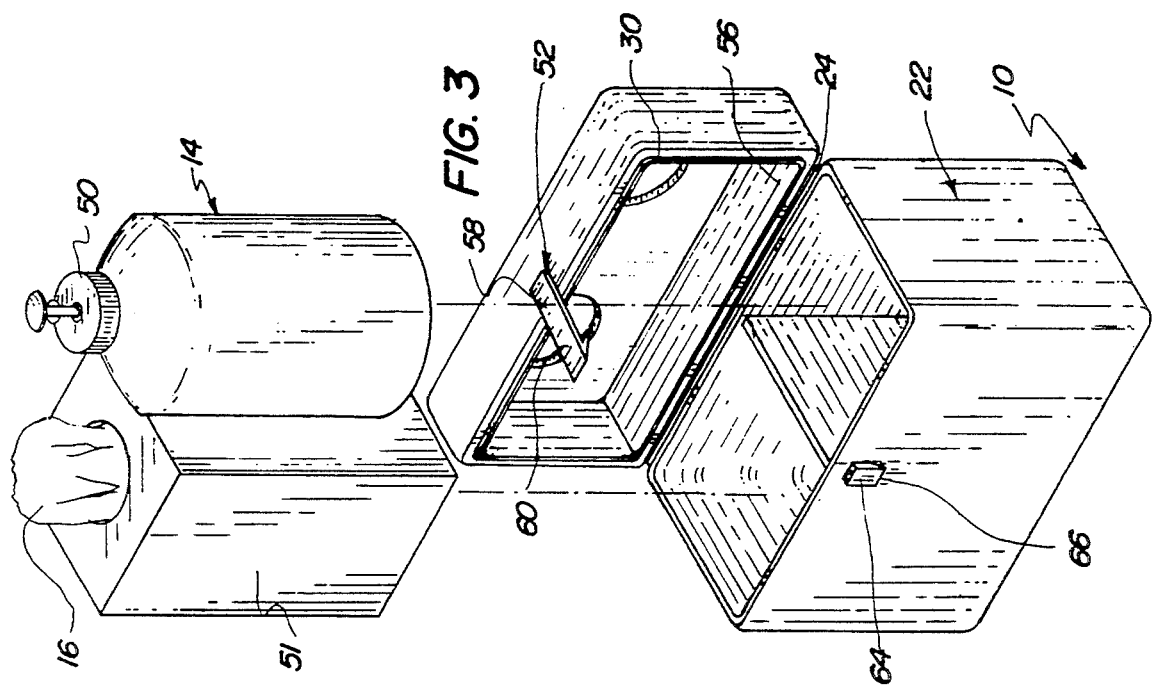
FIG. 3 is an exploded perspective view of the eyeglass cleaning station showing the replacement of lens tissue and cleaning fluid.

Wall 34 may comprise a solid continuum or be perforated in any manner not compromising the requirement that wall 34 maintain separation of the lens cleaning fluid bottle 14 and lens tissues 16. Lid 20 is perforated with a first through hole 38 and a second through hole 40 wherein the first though hole 38 loosely fits a spray top dispensing member 50 of lens cleaning fluid bottle 14 and the second through hole 40 is sized to permit withdrawal of individual lens tissues 16 whereby upon extraction of a single lens tissue 16 another lens tissue 16 is presented for subsequent removal for use. See FIG. 3.

Lens cleaning tissue 16 is introduced and replaced in folded format in a box 51. Lid 20 has a closure latch 52 formed thereon or otherwise affixed centrally upon first side 54 of lid 20 wherein first side 54 is directly opposing a second side 56 wherein second side 56 has hinge 24 attached thereon. Closure latch 52 is a substantially flattened member comprising a first end portion 58 affixed to lid 20, a second central portion 60 forming a short extension freely disposed away from lip 30, and a third end portion 62 having a laterally elongated barblike cross section. Compartmented base 22 has a catch block 64 formed or otherwise affixed thereon wherein the catch block has an angular undercut portion 66 which engages said third end portion 62 of closure latch 52 providing secure engagement of lid 20 with compartmented base 22.

Figure 4:
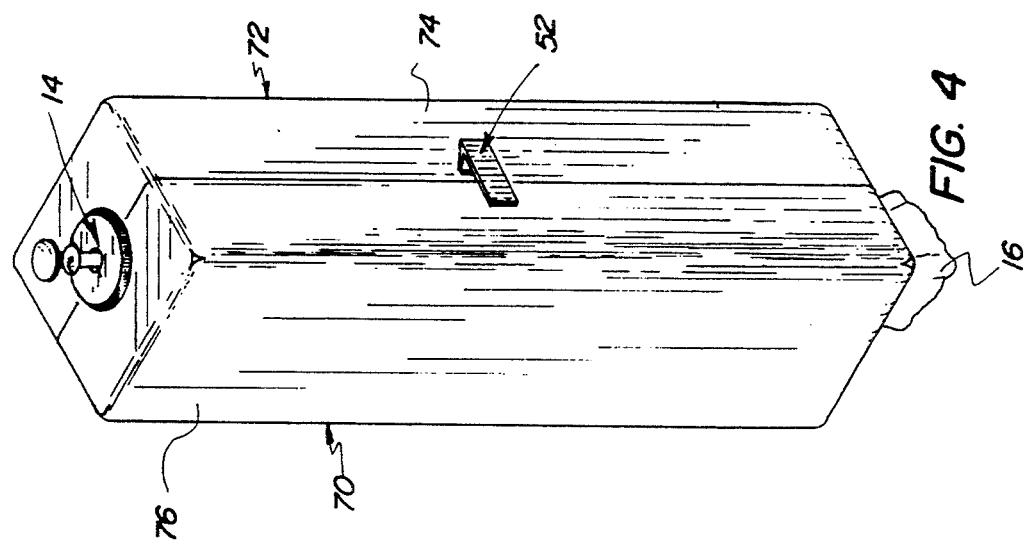
FIG. 4 is a front perspective view of an alternate embodiment of the eyeglass cleaning station showing a vertical disposition of the lens tissue and cleaning fluid.

In an alternate embodiment, the eyeglass cleaning station 70 comprises a side opening compartmented container 72 prepared for wall mounting. See FIGS. 4 and 5. Lens cleaning fluid bottle 14 and lens cleaning tissues 16 are vertically disposed wherein lens tissues 16 are extracted by a downward motion. Compartmented container 72 is held closed by closure latch 52 which engages snap block 64. Compartmented container 72 comprises a first compartment portion 74 and a second compartment portion 76 joined by hinge 78. A cleaning fluid bottle 14 support shelf comprising first shelf member 78 affixed to first compartment portion 74 and second shelf member 80 affixed to second compartment portion 76 is located within the compartmented container 72 such that spray top dispensing member 50 protrudes through upper through hole 90 wherein upper through hole 90 loosely engages spray top dispensing member 50. Lower through hole member 92 is provided to permit extraction of lens tissues 16 as desired. Through hole 90 comprises a first portion 94 being of semicircular shape, and a second portion 96 also of semicircular shape whereby closure of first and second compartment members 74 and 76 produces a completed through hole 90. Through hole 92 is formed by a first semicircular hole 100 and second circular hole 102 also by closure of first and second compartment members 74 and 76. Lip 104 is provided for the purpose of alignment of first and second compartment members 74 and 76 when closed. Vertically disposed adhesive strips 110 are adhesively bonded to the outside of compartment member 74 for the purpose of affixing the eyeglass cleaning station 70 to a wall of a home or office. See FIG. 6. Adhesive strips 110 comprise an elongated tapelike base adhesive member 112 applied to compartment member 74 and temporarily covered by strippable protective tape 114. Protective tape 114 is removed just prior to adhesive fastening of the eyeglass cleaning station 70 to a wall thereby exposing an adhesive surface.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A new and improved eyeglass cleaning station for casual cleaning of eyeglasses comprising:
    a dual compartmented container having laterally adjacent first and second compartments closed on five sides wherein a side forming a top is open,
    a lid member engaging said dual compartmented container thereby providing closure of said compartment tops, and furthermore said lid member is perforated by first and second through holes wherein said first though hole is centrally disposed upon said first compartment and said second through hole is centrally disposed upon said second compartment,
    a supply of dispensable fluid lens cleaning materials housed in a replaceable container disposed within a first compartment and having a container dispensing portion penetrating the first through hole thereby providing external access for dispensing said fluid lens cleaning materials, and
    a supply of disposable tissuelike lens cleaning materials housed in a replaceable container disposed within a second compartment wherein individual tissuelike lens cleaning materials are readily accessible through the second through hole and furthermore being extractable in singular units.

2. The new and improved eyeglass cleaning station of claim 1 in which said lid member is pivotally fastened to said compartmented container by a hinge member.

3. The new and improved eyeglass cleaning station of claim 2 in which said lid member is maintained in engagement with said compartmented container by a latch means.

4. The new and improved eyeglass cleaning station of claim 2 in which said hinge member comprises a flexible continuity of the lid member and the compartmented container.

5. The new and improved eyeglass cleaning station of claim 1 in which said lid member and said compartmented container are of plastic composition.

* * * * *